United States Patent Office 3,371,091
Patented Feb. 27, 1968

3,371,091
SUBSTITUTED 10-(1-PIPERAZINYL ALKYL) PHENOTHIAZINES, AND THEIR SALTS
Jacques Robert Boissier, Paris, and Roger Ratouis, Saint-Cloud, France, assignors to Société anonyme dite: Société Industrielle pour la Fabrication des Antibiotiques (S.I.F.A.), Paris, France, a French company
No Drawing. Filed June 17, 1965, Ser. No. 464,848
Claims priority, application France, June 29, 1964, 979,944; Sept. 28, 1964, 989,555; June 2, 1965, 19,227
13 Claims. (Cl. 260—243)

This invention relates to new substituted 10-(1-piperazinyl alkyl) phenothiazine, their salts and process for the preparation thereof. These compounds have proved to be very useful for human therapeutic purposes, namely as neuroleptics, antihistaminics, antispasmodics and coronary vasodilators.

The new phenothiazines provided by the invention are compounds of the general formula:

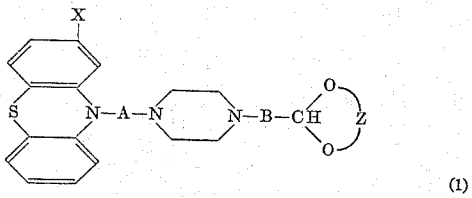

(1)

in which X represents a hydrogen atom, or a halogen atom or a trifluoromethyl, alkyl, alkoxy, thioalkyl or acyl radical, said alkyl, alkoxy, thioalkyl or acyl radicals containing from 1 to 4 carbon atoms (X being in position "2" according to Chemical Abstracts nomenclature), A represents a divalent saturated aliphatic straight or branched hydrocarbon radical containing from 2 to 6 carbon atoms, B represents a divalent saturated aliphatic straight or branched hydrocarbon radical containing from 1 to 4 carbon atoms, and Z represents a divalent saturated aliphatic hydrocarbon radical containing 2 or 3 carbon atoms (i.e. an ethylene or trimethylene radical), which may carry one or more methyl groups.

Compounds according to Formula 1 are bases and this invention relates too to the addition salts which they can form with inorganic or organic acids, and to the process for preparation thereof.

According to the invention, compounds of Formula 1 can be prepared by reacting a 10-(1-piperazinyl alkyl) phenothiazine of the general formula:

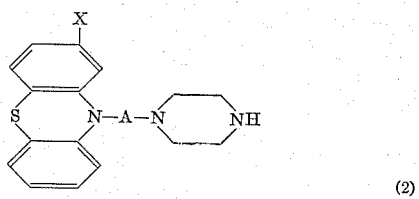

(2)

in which X and A have the meanings defined above, with a substance of the formula:

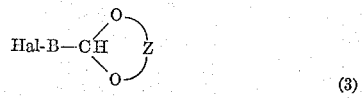

(3)

in which B and Z have the meanings defined above and Hal represents a chlorine or bromine atom, in the presence of an alkaline agent.

This agent combines with the hydracid Hal—H liberated during the reaction and is, preferentially, constituted by a tertiary amine, such as triethylamine, or by the 10-(1-piperazinyl alkyl) phenothiazine of the general Formula 2 itself used, in this case, in excess.

The reaction can be realized with a solvent or without it, but it is better to use a solvent, such as benzene, toluene or xylene and to operate then at the boiling temperature of the reactive medium. The solvent is advantageously chosen so that the salt, which has formed with the hydracid Hal—H and the alkaline agent, is insoluble in that solvent and that on the contrary the desired compound of Formula 1 is soluble in it. In this case, after cooling, the reactive medium is filtered and the compound of Formula 1 is isolated from the solution by usual means.

According to the invention, the compounds of general Formula 1 can also be prepared by reacting a metallic derivative of a phenothiazine of formula:

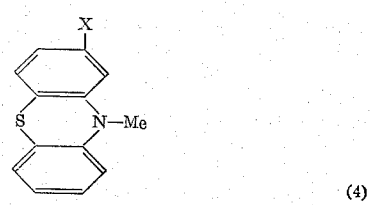

(4)

in which X has the meanings defined above and Me represents a monovalent metallic atom, with a compound of formula:

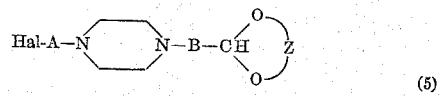

(5)

in which A, B and Z have the meanings defined above and Hal represents a chlorine or a bromine atom.

In a preferred method of carrying out this process, the following procedure is realized:
(a) A phenothiazine of Formula 4 in which the monovalent metal is sodium or lithium is used.
(b) The reaction is carried out in an anhydrous solvent inert towards the two starting compounds, such as ethyl ether tetrahydrofuran, dioxane, benzene, toluene, xylene.
(c) The reaction is carried out at the boiling temperature of the reactive medium.
(d) When the reaction is over, the metallic halide Hal—Me which has formed is separated by filtration and the derivative of Formula 1 is isolated from the solution by usual means.

The compounds of Formula 5 above mentioned, which are necessary to carry out this process can be obtained by means known per se, such as, for instance, the different steps of preparation indicated below:

*1st step.*—N-benzylpiperazine is reacted with a chloride of formula:

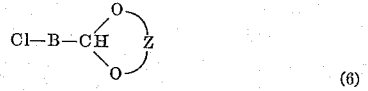

(6)

in which B and Z have the meanings defined above, in a solvent such as ethyl ether, benzene or toluene and at the boiling temperature of the reactive medium. Two moles of N-benzylpiperazine are advantageously used for one mole of the compound of Formula 6 in order to neutralize the hydrochloric acid which has formed during the reaction. Thus is obtained a derivative of formula:

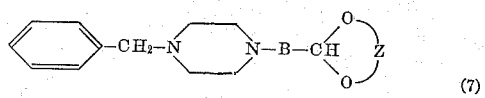

(7)

*2nd step.*—The compound of Formula 7 is then reduced by hydrogen, in the presence of a catalyst, such as palladium deposited on carbon and thus is obtained the derivative of formula:

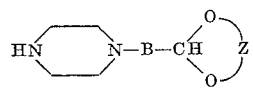
(8)

*3rd step.*—The derivative of Formula 8 is reacted with a bromide of formula Hal—A—Br, in which Hal and A have the meanings defined above, in an anhydrous solvent such as ethyl ether, benzene, toluene and at the boiling temperature of the reactive medium. Two moles of the compound of Formula 8 are advantageously used for one mole of the compound Hal—A—Br in order to neutralize the hydrobromic acid formed during the reaction. Thus the compound of general Formula 5 is obtained.

The acid addition salts of the compounds of general Formula 1 are prepared by treating these compounds with inorganic or organic acids in the presence of a solvent such as acetonitrile or acetone.

The new compounds according to the invention have excellent pharmacological properties specially as neuroleptics, antihistaminics, antispasmodics and coronary vasodilators.

For instance, the N-3-(2-chloro-10-phenothiazinyl) propyl N'-2[2-(1,3-dioxanyl)]ethyl piperazine and its salts, the N-3-(2-methoxy-10-phenothiazinyl) propyl N'-2-[2-(1,3-dioxolanyl)] ethyl piperazine and its salts, the N-3-(2-methoxy-10-phenothiazinyl) propyl N'-2-[2-(1,3-dioxanyl)] ethyl piperazine and its salts, and the N-3-(2-trifluoromethyl-10-phenothiazinyl) propyl N'-2-[2-(1,3-dioxanyl)] ethyl piperazine and its salts showed themselves as particularly active as central nervous system depressors, especially by their neuroleptic action. It was noticed that the first of the aforesaid compounds gave the same performances as chlorpromazine with respect to the tests generally used on animals to check the depressive action of a substance on the central nervous system (traction test, chimney test, or Eddy's test).

Some of the compounds described according to the present invention have an outstanding antihistaminic activity. Measuring this activity by the protective action against lethal doses of histamine (taken as 0.8 mg./kg. of histamine hydrochloride), injected intravenously to guinea pigs, it was shown for instance that 20 mg./kg. of N-3-(10-phenothiazinyl) propyl N'-2-[2-(1,3-dioxolanyl)] ethyl piperazine injected subcutaneously protected the guinea pigs against 1400 lethal doses, that, at the same does, the N-3-(10-phenothiazinyl) propyl N'-2-[2-(1,3-dioxanyl)] ethyl piperazine and the N-3-(10-phenothiazinyl) propyl N'-2-[2-(4-methyl-1,3-dioxolanyl)] ethyl piperazine protected the guinea pigs against 1000 lethal doses, while the N-3-(10-phenothiazinyl) propyl N'-2-[2-(4,5-dimethyl-1,3-dioxolanyl)] ethyl piperazine and the N-3-(10-phenothiazinyl) propyl N'-2-[2-(4-methyl-1,3-dioxanyl)] ethyl piperazine protected the guinea pigs against 600 lethal doses. In these tests the compounds were used as disuccinates.

It was also noted that the coronary vasodilator activity of several compounds according to the general Formula 1 and their salts was extremely high; for instance, using the Langendorff method on the perfused isolated rabbit heart, the N-3-(10-phenothiazinyl) propyl N'-2-[2-(4-methyl-1,3-dioxanyl)] ethyl piperazine, the N-3-(2-chloro-10-phenothiazinyl) propyl N'-2-[2-(4,5-dimethyl-1,3-dioxolanyl)] ethyl piperzine and the N-1-(10-phenothiazinyl)-2-propyl N'-2-[2-(4,5-dimethyl-1,3-dioxolanyl)] ethyl piperazine have a coronary vasodilator activity from a 1 mcg. dose injected into the perfusion liquid. In these tests the compounds were used as disuccinates.

The lethal doses 50 of the compounds according to the invention checked in mice by intraperitoneal tract were between 50 mg./kg. and 400 mg./kg.

Because of these various properties, the compounds according to the invention are uesful drugs for the treatment of numerous human diseases and specifically for neurogetativ disorders, mental and behaviour disturbances, allergies, spasmodic disturbances of the digestive tract, coronary insufficiencies and their consequences.

The usual dose varies according to the compound used, the utilized route, the seriousness of the case and the wanted result; per os, for a human being the dose is about 10 mg. to 200 mg. per day. In their use as drugs, these new substituted 10-(1-piperazinyl alkyl) phenothiazines can be used either as bases or as pharmaceutically acceptable mono- or di-acid addition salts. Among these salts preferentially are used those which are obtained with the hydrochloric, hydrobromic, sulfuric, phosphoric, acetic, maleic, fumaric, tartaric, benzoic cinnamic, succinic and citric acids.

The present invention is also concerned with pharmaceutical compositions which comprise as active principles one or more of the compounds according to the general Formula 1 and/or their salts. These compositions are prepared so as to be capable of being administered through the digestive or parenteral tracts; they may be solids or liquids and exist in the pharmaceutical forms currently employed in human medicine, as for example tablets, coated tablets, capsules, granulated substances, suppositories and preparations which can be injected; there are prepared by the usual methods. The active principle or principles are incorporated therein with various excipients normally employed in these pharmaceutical compositions, for example, talcum, gum arabic, lactose, starch, magnesium stearate, cocoa butter, aqueous or non-aqueous vehicles, the various wetting dispersing, or emulsifying agents and preservatives.

The following nonlimiting examples illustrate the invention.

EXAMPLE 1

A solution of 16.25 g. of N-3-(10-phenothiazinyl) propyl piperazine, 22.5 g. of 2-(2-chloro ethyl)-1,3-dioxane and 15 g. of triethylamine in 200 ml. of toluene was heated under reflux for 40 hours, with stirring. After cooling, the solution was filtered, concentrated in vacuo to drive off the solvent and the unreacted reagents and the oily residue was taken up in 50 ml. of boiling ethyl acetate. After cooling, 16.6 g. (76% yield) of crystalline N-3-(10-phenothiazinyl) propyl N'-2-[2-(1,3-dioxanyl)] ethyl piperazine were obtained.

Melting point: 98°–101° C. on a hot stage microscope after recrystallization from ethyl acetate.

*Analysis* — $C_{25}H_{33}N_3O_2S$. — Calculated, percent: C, 68.30; H, 7.57. Found, percent: C, 68.2; H, 7.5.

EXAMPLE 2

4.4 g. of the base obtained in Example 1 were dissolved in 20 ml. of N-hydrochloric acid. The solution was evaporated to dryness in vacuo and crystalline N-3-(10-phenothiazinyl) propyl N'-2-[2-(1,3-dioxanyl)] ethyl piperazine dihydrochloride was obtained quantitatively. Melting point: 200–205° C. on a hot stage microscope.

*Analysis*—$C_{25}H_{35}Cl_2N_3O_2S$.—Calculated, percent: Cl, 13.84. Found, percent: Cl, 13.6.

EXAMPLE 3

A warm solution of 4.4 g. of the base obtained in Example 1 in 100 ml. of acetonitrile was added to a warm solution of 2.5 g. of succinic acid in 200 ml. of acetonitrile. After standing for 15 hours at 0° C., 5.5 g. of crystalline N-3-(10-phenothiazinyl) propyl N'-2-[2-(1,3-dioxanyl)] ethyl piperazine disuccinate were obtained. Melting point: 138°–140° C. on a hot stage microscope.

*Analysis* — $C_{33}H_{45}N_3O_{10}S$. — Calculated, percent: C, 58.65; H, 6.71. Found, percent: C, 59.0; H, 6.8.

EXAMPLE 4

A solution of 6.5 g. of N-3-(10-phenothiazinyl) propyl piperazine and 1.5 g. of 2-(2-chloro ethyl)-1.3-dioxane in 70 ml. of dry toluene was refluxed for 48 hours with stirring. After cooling the solution was filtered and concentrated in vacuo. The oily residue was taken up in 80 ml. of warm ethyl acetate and this solution was added to a warm solution of 3 g. of maleic acid in 50 ml. of acetonitrile. After standing for 15 hours at 0° C., 6 g. of N-3-(10-phenothiazinyl) propyl N'-2 - [2 - (1,3-dioxanyl)] ethyl piperazine dimaleate were collected and recrystallized from a mixture of 95% ethanol and acetone. Melting point: 171°–175° C. on a hot stage microscope.

Analysis — $C_{33}H_{41}N_3O_{10}S$. — Calculated, percent: C, 59.00; H, 6.15. Found, percent: C, 59.2; H, 6.2.

EXAMPLE 5

Following the procedure described in Example 1, but using 20.5 g. of 2-(2-chloro ethyl)-1,3-dioxolane, 15.3 g. (72% yield) of crystalline N-3-(10-phenothiazinyl) propyl N'-2-[2-(1,3-dioxolanyl)] ethyl piperazine were obtained. Melting point: 98°–100° C. on a hot stage microscope after recrystallization from ethyl acetate.

Analysis — $C_{24}H_{31}N_3O_2S$. — Calculated, percent: C, 67.71; H, 7.34. Found, percent: C, 67.7; H, 7.2.

EXAMPLE 6

Following the procedure described in Example 3, but using 4.25 g. of the base obtained in Example 5, 5.75 g. of crystalline N-3-(10-phenothiazinyl) propyl N'-2-[2-(1,3-dioxolanyl)] ethyl piperazine disuccinate were obtained. Melting point: 132°–134° C. on a hot stage microscope.

Analysis — $C_{32}H_{43}N_3O_{10}S$. — Calculated, percent: C, 58.07; H, 6.55. Found, percent: C, 57.9; H, 6.3.

The difumarate was prepared in the same way. Melting point: 191°–197° C. on a hot stage microscope.

Pharmacological study of the disuccinate

On guinea pig isolated ileum, the inhibitory concentrations 50% are $5 \times 10^{-6}$ in respect to acetylcholine, $2 \times 10^{-8}$ in respect to histamine, and $5 \times 10^{-6}$ in respect to baryum chloride.

The bronchospasm recording according to Halpern's technique has shown a protective effect against histamine at 0.2 mg./kg. dose intravenously. In dogs, the suppression of vomitings produced by apomorphine (0.1 mg./kg. subcutaneously) after the administration of 0.5 mg. or 1 mg./kg. of the compound was recorded. The arterial pressure recording in dogs submitted to chloral narcosis has shown an hypotensive action. The dose of 0.5 mg./kg. produces the reversion of adrenalinic hypertension.

EXAMPLE 7

Following the procedure described in Example 1, but using 22.5 g. of 2-(2-chloro ethyl)-4-methyl-1,3-dioxolane, 20.7 g. (94% yield) of crystalline N-3-(10-phenothiazinyl) propyl N'-2-[2 - (4-methyl-1,3-dioxolanyl)] ethyl piperazine were obtained. Melting point: 99°–102° C. on a hot stage microscope after recrystallization from ethyl acetate.

Analysis — $C_{25}H_{33}N_3O_2S$. — Calculated, percent: C, 68.30; H, 7.57. Found, percent: C, 68.7; H, 7.6.

EXAMPLE 8

Following the procedure described in Example 3, but using 4.4 g. of the base obtained in Example 7, 5.95 g. of crystalline N-3-(10-phenothiazinyl) propyl N'-2-[2-(4-methyl-1,3-dioxolanyl)] ethyl piperazine disuccinate were obtained. Melting point: 138°–141° C. on a hot stage microscope.

Analysis — $C_{33}H_{45}N_3O_{10}S$. — Calculated, percent: C, 58.65; H, 6.71. Found, percent: C, 58.7; H, 6.8.

EXAMPLE 9

Following the procedure described in Example 1, but using 24.7 g. of 2-(2-chloro ethyl)-4,5-dimethyl-1,3-dioxolane, 18.1 g. (80% yield) of crystalline N-3-(10-phenothiazinyl) propyl N'-2-[2-(4,5-dimethyl-1,3-dioxolanyl)] ethyl piperazine were obtained. Melting point: 94°–97° C. on a hot stage microscope after recrystallization from ethyl acetate.

Analysis — $C_{26}H_{35}N_3O_2S$. — Calculated, percent: C, 68.84; H, 7.78. Found, percent: C, 68.5; H, 7.4.

EXAMPLE 10

Following the procedure described in Example 3, but using 4.53 g. of the base obtained in Example 9, 5 g. of crystalline N-3-(10-phenothiazinyl) propyl N'-2-[2-(4,5-dimethyl-1,3-dioxolanyl)] ethyl piperazine disuccinate were obtained. Melting point: 139°–142° C. on a hot stage microscope.

Analysis — $C_{34}H_{47}N_3O_{10}S$. — Calculated, percent: C, 59.20; H, 6.87. Found, percent: C, 59.3; H, 6.6.

EXAMPLE 11

Following the procedure described in Example 1, but using 24.6 g. of 2-(2-chloro ethyl)-4-methyl-1,3-dioxane, 14.1 g. (62% yield) of crystalline N-3-(10-phenothiazinyl) propyl N'-2-[2-(4-methyl-1,3-dioxanyl)] ethyl piperazine were obtained. Melting point: 88°–90° C. on a hot stage microscope after recrystallization from ethyl acetate.

Analysis — $C_{26}H_{35}N_3O_2S$. — Calculated, percent: C, 68.84; H, 7.78. Found, percent: C, 68.9; H, 7.5.

EXAMPLE 12

Following the procedure described in Example 3, but using 4.53 g. of the base obtained in Example 11, 4.7 g. of crystalline N-3-(10-phenothiazinyl) propyl N'-2-[2-(4-methyl-1,3-dioxanyl)] ethyl piperazine disuccinate were obtained. Melting point: 129°–131° C. on a hot stage microscope.

Analysis — $C_{34}H_{47}N_3O_{10}S$. — Calculated, percent: C, 59.20; H, 6.87. Found, percent: C, 59.3; H, 7.0.

EXAMPLE 13

A solution of 8.9 g. of N-3-(2-methoxy-10-phenothiazinyl) propyl piperazine, 10.25 g. of 2-(2-chloro ethyl)-1,3-dioxolane and 7.5 g. of triethylamine in 100 ml. of toluene was refluxed for 40 hours with stirring. After cooling, the solution was filtered, concentrated in vacuo to drive off the solvent and the unreacted reagents and the oily residue was dissolved in 100 ml. of warm acetonitrile, this warm solution was added to a warm solution of 6.25 g. of succinic acid in 400 ml. of acetonitrile. After filtration in the cold, 10.5 g. (61% yield) of crystalline N-3-(2-methoxy-10-phenothiazinyl) propyl N'-2-[2-(1,3-dioxolanyl)] ethyl piperazine disuccinate were obtained. Melting point: 100°–101° C. on a hot stage microscope after recrystallization from acetone.

Analysis — $C_{33}H_{45}N_3O_{11}S$. — Calculated, percent: C, 57.29; H, 6.56. Found, percent: C, 57.1; H, 6.9.

EXAMPLE 14

Following the procedure described in Example 13, but adding the warm solution of crude base in 100 ml. of acetonitrile to the warm solution of 6.25 g. of maleic acid in 300 ml. of acetonitrile, 13 g. (76% yield) of N-3-(2-methoxy-10- phenothiazinyl) propyl N'-2-[2-(1,3-dioxolanyl)] ethyl piperazine dimaleate were obtained. Melting point: 164°–166° C. on a hot stage microscope after recrystallization from methylethylacetone.

EXAMPLE 15

Following the procedure described in Example 13, but using 11.3 g. of 2-(2-chloro ethyl)-1,3-dioxane, 10.3 g. (58.5% yield) of N-3-(2-methoxy-10-phenothiazinyl) propyl N'-2-[2-(1,3-dioxanyl)] ethyl piperazine disuccinate were obtained. Melting point: 81°–83° C. on a hot stage microscope after recrystallization from acetone.

Analysis — $C_{34}H_{47}N_3O_{11}S$. — Calculated, percent: C, 57.85; H, 6.71. Found, percent: C, 57.3; H, 6.8.

Pharmacological study

On guinea pig isolated ileum, the inhibitory concentrations 50% are $5\times10^{-6}$ in respect to acetylcholine and $10^{-6}$ in respect to histamine.

A central nervous system depressive action was shown at the dose of 10 mg./kg. in mice intraperitoneally by traction and chimney tests. The compound protects against electroshock at the dose of 50 mg./kg. It is very active against writhing test producted in mice by the injection of phenylbenzoquinone. It protentializes the barbituric narcosis. In dogs submitted to chloral narcosis, it reduces (0.1 mg./kg.) and even reverses (0.8 mg./kg.) the adrenalinic hypertension.

EXAMPLE 16

Following the procedure described in Example 13, but using 9 g. of N-3-(2-chloro-10-phenothiazinyl) propyl piperazine and 10.25 g. of 2-(2-chloro ethyl)-1,3-dioxolane, 14.45 g. (83% yield) of N-3-(2-chloro-10-phenothiazinyl) propyl N'-2-[2-(1,3-dioxolanyl)] ethyl piperazine disuccinate were obtained. Melting point: 128°–130° C. on a hot stage microscope after recrystallization from acetone.

Analysis—$C_{32}H_{42}ClN_3O_{10}S$. — Calculated, percent: C, 55.20; H, 6.08. Found, percent: C, 55.0; H, 6.2.

EXAMPLE 17

Following the procedure described in Example 13, but using 9 g. of N-3-(2-chloro-10-phenothiazinyl) propyl piperazine and 11.3 g. of 2-(2-chloro ethyl)-1,3-dioxane, 14 g. (78.5% yield) of N-3-(2-chloro-10-phenothiazinyl) propyl N'-2-[2-(1,3-dioxanyl)] ethyl piperazine disuccinate were obtained. Melting point: 147° C. on a hot stage microscope after recrystallization from acetone.

Analysis—$C_{33}H_{44}ClN_3O_{10}S$.—Calculated, percent: C, 55.80; H, 6.24. Found, percent: C, 55.7; H, 6.3.

Pharmacological study

The lethal dose 50 intravenously in mice is 79 mg./kg. On guinea pig isolated ileum, the inhibitory concentrations 50% are $5\times10^{-6}$ in respect to acetylcholine, histamine and baryum chloride. Traction and chimney tests are negative from 2 mg. to 5 mg./kg. These same doses potentialize the mebubarbital hypnotic activity and antagonize the phenylbenzoquinone activity. In dogs submitted to chloral narcosis, the recording of the carotid pressure has shown a pressure decrease from 0.5 mg./kg. and a reduction of the adrenalinic hypertension. The latter is reversed at the dose of 1 mg./kg.

EXAMPLE 18

Following the procedure described in Example 13, but using 9 g. of N-3-(2-chloro-10-phenothiazinyl) propyl piperazine and 12.35 g. of 2-(2-chloro ethyl)-4,5-dimethyl-1,3-dioxolane, 13.2 g. (73% yield) of N-3-(2-chloro-10-phenothiazinyl) propyl N'-2-[2-(4,5-dimethyl-1,3-dioxolanyl] ethyl piperazine disuccinate were obtained. Melting point: 146°–148° C. on a hot stage microscope.

Analysis — $C_{34}H_{46}ClN_3O_{10}S$. — Calculated, percent: C, 56.38; H, 6.40. Found, percent: C, 56.7; H, 6.7.

EXAMPLE 19

Following the procedure described in Example 13, but using 17 g. of N-4-(10-phenothiazinyl) butyl piperazine and 20.5 g. of 2-(2-chloro ethyl)-1,3-dioxolane, 26.1 g. (77% yield) of N-4-(10-phenothiazinyl) butyl N'-2-[2-(1,3-dioxolanyl)] ethyl piperazine disuccinate were obtained. Melting point: 108°–113° C. on a hot stage microscope after recrystallization from acetone.

Analysis — $C_{33}H_{45}N_3O_{10}S$. — Calculated, percent: C, 58.65; H, 6.71. Found, percent: C, 58.6; H, 6.7.

EXAMPLE 20

Following the procedure described in Example 13, but using 17 g. of N-4-(10-phenothiazinyl) butyl piperazine and 22.6 g. of 2-(2-chloro ethyl)-1,3-dioxane, 27 g. (78% yield) of N-4-(10-phenothiazinyl) butyl N'-2-[2-(1,3-dioxanyl)] ethyl piperazine disuccinate were obtained. Melting point: 124°–128° C. on a hot stage microscope after rcerystallization from acetone.

Analysis — $C_{34}H_{47}N_3O_{10}S$. — Calculated, percent: C, 59.20; H, 6.87. Found, percent: C, 58.8; H, 6.9.

EXAMPLE 21

Following the procedure described in Example 1, but using 8.1 g. of N-1-(10-phenothiazinyl)-2-propyl piperazine, 10.25 g. of 2-(2-chloro ethyl)-1,3-dioxolane and 7.5 g. of triethylamine, 4.25 g. (40% yield) of crystalline N-1-(10-phenothiazinyl)-2-propyl N'-2-[2-(1,3-dioxolanyl)] ethyl piperazine were obtained. Melting point: 83°–85° C. on a hot stage microscope after recrystallization from ethyl acetate.

EXAMPLE 22

Following the procedure described in Example 3, but using 4.25 g. of the base obtained in Example 21, 3 g. of crystalline N-1-(10-phenothiazinyl)-2-propyl N'-2-[2-(1,3-dioxolanyl)] ethyl piperazine disuccinate were obtained. Melting point: 109°–111° C. on a hot stage microscope.

Analysis — $C_{32}H_{43}N_3O_{10}S$. — Calculated, percent C, 58.07; H, 6.55. Found, percent: C, 57.7; H, 6.6.

EXAMPLE 23

Following the procedure described in Example 1, but using 8.1 g. of N-1-(10-phenothiazinyl)-2-propyl piperazine, 12.35 g. of 2-(2-chloro ethyl)-4,5-dimethyl-1,3-dioxolane and 7.5 g. of triethylamine, 6.4 g. (57% yield) of crystalline N-1-(10-phenothiazinyl)-2-propyl N'-2-[2-(4,5-dimethyl-1,3-dioxolanyl)] ethyl piperazine were obtained. Melting point: 126°–127° C. on a hot stage microscope.

Analysis — $C_{26}H_{35}N_3O_2S$. — Calculated, percent: C, 68.84; H, 7.78. Found, percent: C, 69.0; H, 7.7.

EXAMPLE 24

Following the procedure described in Example 3, but using 4.5 g. of the base obtained in Example 23, 4.5 g. of crystalline N-1-(10-phenothiazinyl)-2-propyl N'-2-[2-(4,5-dimethyl-1,3-dioxolanyl)] ethyl piperazine disuccinate were obtained. Melting point: 123°–126° C. on a hot stage microscope.

Analysis — $C_{34}H_{47}H_3O_{10}S$. — Calculated, percent: C, 59.20; H, 6.87. Found, percent: C, 59.3; H, 7.0.

EXAMPLE 25

Preparation of the following intermediary derivative: N-4-(10-phenothiazinyl) butyl piperazine 77 g. of 1-bromo-4-chloro butane were added to a solution of 60 g. of sodium phenothiazine in 400 ml. of liquid ammonia and the mixture was stirred for one hour, after that 600 ml. of dry toluene were slowly added and the mixture was refluxed with stirring for 15 hours. After filtration, toluene was driven off in vacuo. The residual oil was dissolved in 400 ml. of methylethylacetone, then 80 g. of dry piperazine and 45 g. of sodium iodide were added. The mixture was refluxed with stirring for 15 hours. After filtration and concentration the mixture was dissolved in 250 ml. of chloroform. This solution was washed with a saturated solution of sodium chloride, concentrated and distilled.

54.2 g. (54% yield) of oily N-4-(10-phenothiazinyl) butyl piperazine were obtained. Boiling point: 235°–240° C. under 0.15 mm. of Hg.

Its dimaleate salt made in acetonitrile and recrystallized from methanol melts at 161°–164° C. on a hot stage microscope.

Analysis — $C_{28}H_{33}N_3O_8S$. — Calculated, percent: C, 58.83; H, 5.87. Found, percent: C, 58.9 H, 5.7.

EXAMPLE 26

*Preparation of the following intermediary derivative: 2-(2-chloro ethyl)-4-methyl-1,3-dioxolane*

36.5 g. of dry gaseous hydrochloric acid were slowly added to a solution of 56 g. of acrolein and 76 g. of 1,2-propanediol in 200 ml. of chloroform keeping the temperature between −10° C. and −5° C. The chloroform layer was separated, washed with water, with diluted sodium bicarbonate solution and again with water. The solution was concentrated and distilled off 106.8 g. (71% yield) of oily 2-(2-chloro ethyl)-4-methyl-1,3-dioxolane were obtained. Boiling point: 63°–65° C. under 12 mm. of Hg.

EXAMPLE 27

*N-3-(10-phenothiazinyl) propyl N'-2-[2-(4,4,6-trimethyl-1,3-dioxany)] ethyl piperazine disuccinate*

Following the procedure described in Example 13, but using 8.1 g. of N-3-(10-phenothiazinyl) propyl piperazine, 14.4 g. of 2-(2-chloro ethyl)-4,4,6-trimethyl-1,3-dioxane and 7.5 g. of triethylamine, 13 g. (73% yield) of N-3(10-phenothiazinyl) propyl N'-2-[2-(4,4,6-trimethyl-1,3-dioxanyl)] ethyl piperazine disuccinate were obtained. Melting point: 113°–115° C. on a hot stage micorscope after recrystallization from acetone.

Analysis — $C_{36}H_{51}N_3O_{10}S$. — Calculated, percent: C, 60.23; H, 7.16. Found, percent: C, 60.0; H, 7.3.

EXAMPLE 28

*N-3-(10 - phenothiazinyl) propyl N'-2-[2-(4,4,5,5-tetramethyl-1,3-dioxolanyl)] ethyl piperazine disuccinate*

Following the procedure described in Example 13, but using 8.1 g. of N-3-(10-phenothiazinyl) propyl piperazine, 14.4 g. of 2-(2-chloro ethyl)-4,4,5,5-tetramethyl-1,3-dioxolane and 7.5 g. of triethylamine, 10.7 g. (60% yield) of N-3-(10-phenothiazinyl) propyl N'-2-[2-(4,4,5,5-tetramethyl-1,3-dioxolanyl)] ethyl piperazine disuccinate were obtained. Melting point: 147°–150° C. on a hot stage microscope after recrystallization from acetone.

Analysis — $C_{36}H_{51}N_3O_{10}S$. — Calculated, percent: C, 60.23; H, 7.16. Found, percent: C, 60.0; H, 7.15.

EXAMPLE 29

*N-3-(2-trifluoromethyl-10-phenothiazinyl) propyl N'-2-[2-(1,3-dioxanyl)] ethyl piperazine disuccinate*

Following the procedure described in Example 13, but using 9.8 g. of N-3-(2-trifluoromethyl-10-phenothiazinyl) propyl piperazine, 11.3 g. of 2-(2-chloro ethyl)-1,3-dioxane and 7.5 g. of triethylamine, 14.1 g. (76% yield) of N-3-(2-trifluoromethyl-10-phenothiazinyl) propyl N'-2-[2-(1,3-dioxanyl)] ethyl piperazine disuccinate were obtained. Melting point: 136°–138° C. on a hot stage microscope.

Analysis—$C_{34}H_{44}F_3N_3O_{10}S$.—Calculated, percent: N, 5.65; S, 4.31. Found, percent: N, 5.5; S, 4.6.

Pharmacological study

In mice the lethal dose 50 intravenously is 94 mg./kg. and intraperitoneally is 175 mg./kg. On guinea pig isolated ileum, the inhibitory concentrations 50% are $10^{-5}$ in respect to acetylcholine and $10^{-7}$ in respect to histamine. The compound antagonizes completely, at the dose of 25 mg./kg., the normal responses to the traction and chimney tests and greatly potentializes the mebubarbital narcosis. From the dose of 5 mg./kg., it counteracts the writhing test syndrome produced by the phenylbenzoquinone. On dogs, it is an hypotensor and it reverses at the dose of 1 mg./kg. the hypertensive properties of adrenaline.

EXAMPLE 30

*N-2-(10-phenothiazinyl) ethyl N'-2-[2-(1,3-dioxanyl)] ethyl piperazine disuccinate*

Following the procedure described in Example 13, but using 7.8 g. of N-2-(10-phenothiazinyl) ethyl piperazine, 11.3 g. of 2-(2-chloro ethyl)-1,3-dioxane and 7.5 g. of triethylamine, 11.2 g. (68% yield) of N-2-(10-phenothiazinyl) ethyl N'-2-[2-(1,3-dioxanyl)] ethyl piperazine disuccinate were obtained. Melting point: 117°–120° C. on a hot stage microscope.

Analysis—$C_{32}H_{43}N_3O_{10}S$. — Calculated, percent: C, 58.08; H, 6.55. Found, percent: C, 58.2; H, 6.4.

EXAMPLE 31

*Preparation of the following intermediary derivative: 2-(2-chloro ethyl)-4,4,5,5-tetramethyl dioxolane*

Following the procedure described in Example 26, but using 118 g. of 2,3-dimethyl-2,3-butanediol, 93 g. (48% yield) of oily 2-(2-chloro ethyl)-4,4,5,5-tetramethyl dioxolane were obtained. Boiling point: 97°–99° C. under 22 mm. of Hg ($n_D^{22}$=1.4455).

EXAMPLE 32

*N-3-(2-trifluoromethyl-10-phenothiazinyl) propyl N'-2-[2-(1,3-dioxanyl)] ethyl piperazine disuccinate*

The sodium derivative of the 2-trifluoromethyl phenothiazine was prepared from 26.7 g. (0.1 mole) of 2-trifluoromethyl phenothiazine and 2.3 g. (0.1 atom. g.) of sodium in 500 ml. of liquid ammonia. After the reaction was completed, the ammonia was driven off and 500 ml. of dry toluene were added. To this solution was added drop by drop a solution of 25 g. (0.09 mole) of N-(3-chloro propyl) N'-[2-(1,3-dioxanyl) ethyl] piperazine in 200 ml. of toluene and refluxed with stirring during 18 hours. After cooling, the precipitate which had formed was filtered, the filtrate washed with water, dried and concentrated in vacuo. 33 g. of a brown oil: the N-3-(2-trifluoromethyl-10-phenothiazinyl) propyl N'-2-[2-(1,3-dioxanyl)] ethyl piperazine were obtained. The disuccinic derivative was prepared indentically as in Example 29.

The starting N-(3-chloro propyl) N'-[2-(1,3-dioxanyl) ethyl] piperazine was prepared according to the following procedure:

(A) *Preparation of the N-benzyl N'-[2-(1,3-dioxanyl) ethyl] piperazine*

A solution of 85.3 g. (0.57 mole) of 2-(2-chloro ethyl)-1,3-dioxane and 200 g. of (1.14 moles) of N-benzyl piperazine in 425 ml. of dry toluene was refluxed with stirring during 16 hours. After cooling, the precipitate of N-benzyl piperazinum chloride was filtered. The filtrate was concentrated in vacuo and the residual oil distilled.

148.4 g. (90% yield) of a colorless oil: the N-benzyl N'-[2-(1,3-dioxanyl) ethyl] piperazine were obtained. Boiling point: under 0.001 mm. of Hg: 155°–165° C. ($n_D^{22}$=1.5280). The oil slowly crystallized. After recrystallization from hexane, white crystals were obtained. Melting point: 45°–46° C. on a hot stage microscope.

Analysis.—$C_{17}H_{26}N_2O_2$: N, percent—Calculated: 9.7. Found: 9.9.

The dihydrochloride of this compound occurred as white crystals. Melting point: 230° C.

Analysis. — $C_{17}H_{28}Cl_2N_2O_2$: Cl, percent — Calculated: 19.6. Found: 19.2.

(B) *Preparation of the N-[2-(1,3-dioxanyl) ethyl] piperazine*

A mixture of 58 g. (0.2 mole) of N-benzyl N'-[2-1,3-dioxanyl) ethyl]piperazine, 400 ml. of absolute ethanol and 3 g. of 5% palladium on carbon was stirred at 50° C. under hydrogen. When 4480 ml. of hydrogen were absorbed, the mixture was cooled, the catalyst filtered off, the filtrate concentrated in vacuo and the residual oil distilled off. 34.8 g. (87% yield) of N-[2-1,3-dioxanyl) ethyl]piperazine which occurred as a colorless oil were obtained. Boiling point: 118°–120° C. under 0.1 mm. of Hg pressure ($n_D^{22}$=1.4920).

*Analysis.*—C₁₀H₂₀N₂O₂: N, percent—Calculated: 14.0. Found: 14.2.

Melting point of the mono-hydrobromide derivative 170°–172° C. on a hot stage microscope after recrystallization from a mixture of methanol-ether.

*Analysis* — C₁₀H₂₁BrN₂O₂. — Calculated, percent: C, 42.7; H, 7.5. Found, percent: C, 43.1; H, 7.6.

(C) *Preparation of N-(3-chloro propyl) N'-[2-(1,3-dioxanyl) ethyl] piperazine*

A solution of 30 g. (0.15 mole) of N-[2-(1,3-dioxanyl) ethyl] piperazine and 11.8 g. (0.075 mole) of 1-bromo-3-chloro propane in 150 ml. of dry benzene was refluxed with stirring for 5 hours. After cooling, the N-[2-(1,3-dioxanyl) ethyl] piperazinium bromide which had precipitated was filtered off, the filtrate was concentrated in vacuo and the residual oil was distilled. 14.1 g. (68% yield) of N-(3-chloro propyl) N' - [2 - (1,3 - dioxanyl) ethyl] piperazine which occurred as a light yellow oil were obtained. Boiling point: 152°–155° C. under 0.07 mm. of Hg pressure ($n_D^{23}$=1.4940). The disuccinate prepared in acetone and recrystallized from acetone melts at 104°–105° C. on a hot stage microscope.

EXAMPLE 33

Tablets which corresponded to the following formula were prepared:

N-3-(10 - phenothiazinyl) propyl N'-2-[2-(1,3-dioxolanyl)] ethyl piperazine disuccinate  mg  25
Excipient q.s.p.  tablet  1

EXAMPLE 34

Tablets which corresponded to the following formula were prepared:

N-3-(2-methoxy-10-phenothiazinyl) propyl N'-2-(1,3-dioxanyl)] ethyl piperazine disuccinate  mg  25
Excipient q.s.p.  tablet  1

EXAMPLE 35

Tablets which corresponded to the following formula were prepared:

N-3-(2 - chloro - 10 - phenothiazinyl) propyl N'-2-[2-(1,3-dioxanyl)] ethyl piperazine disuccinate  mg  25
Excipient q.s.p.  tablet  1

EXAMPLE 36

Tablets which corresponded to the following formula were prepared:

N - 3 - (2 - trifluoromethyl - 10 - phenothiazinyl) propyl N' - 2 - [2 - (1,3 - dioxanyl)] ethyl piperazine disuccinate  mg  25
Excipient q.s.p.  tablet  1

EXAMPLE 37

Parenteral ampoules which corresponded to the following formula were prepared:

N-3-(2 - chloro - 10 - phenothiazinyl) propyl N'-2-[2-(1,3-dioxanyl)] ethyl piperazine disuccinate  mg  25
Aqueous solution q.s.p.  ml  5

EXAMPLE 38

Parenteral ampoules which corresponded to the following formula were prepared:

N - 3 - (2 - trifluoromethyl - 10 - phenothiazinyl) propyl N' - 2 - [2 - (1,3 - dioxanyl)] ethyl piperazine disuccinate  mg  25
Aqueous solution q.s.p.  ml  5

What we claim is:

1. A compound of the class consisting of a base and a pharmaceutically acceptable acid addition salts thereof, said base having the formula:

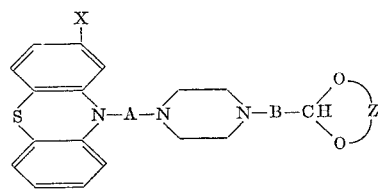

in which X is a member selected from the group consisting of a hydrogen, a halogen, a trifluoromethyl, an alkyl, an alkoxy and a thio-alkyl radical, said alkyl, alkoxy and thioalkyl radicals containing from 1 to 4 carbon atoms, A represents an alkylene radical containing from 2 to 6 carbon atoms, B represents an alkylene radical containing from 1 to 4 carbon atoms, and Z is a member selected from the group consisting of ethylene, trimethylene, methylethylene, polymethylethylene, methyltrimethylene and polymethyltrimethylene.

2. A compound of the class consisting of a base and a pharmaceutically acceptable acid addition salt thereof, said base having the formula:

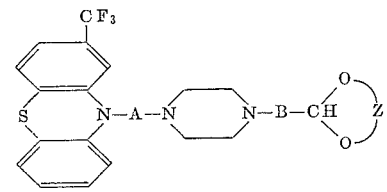

in which A represents a divalent saturated aliphatic hydrocarbon radical containing from 2 to 6 carbon atoms, B represents a divalent saturated aliphatic hydrocarbon radical containing from 1 to 4 carbon atoms, and Z is a member selected from the group consisting of ethylene, trimethylene, methylethylene, polymethylethylene, methyltrimethylene and polymethyltrimethylene.

3. A compound of the class consisting of N-3-(2-chloro - 10 - phenothiazinyl) propyl N'-2-[2-(1,3-dioxanyl)] ethyl piperazine and a pharmaceutically acceptable acid addition salt thereof.

4. A compound of the class consisting of N-3-(2-methoxy-10-phenothiazinyl) propyl N'-2-[2 - (1,3-dioxolanyl)] ethyl piperazine and a pharmaceutically acceptable acid addition salt thereof.

5. A compound of the class consisting of N-3-(2-methoxy - 10 - phenothiazinyl) propyl N' - 2 - [2-(1,3-dioxanyl)] ethyl piperazine and a pharmaceutically acceptable acid addition salt thereof.

6. A compound of the class consisting of N-3-(2-trifluoromethyl - 10 - phenothiazinyl) propyl N'-2-[2-(1,3-dioxanyl)] ethyl piperazine and a pharmaceutically acceptable acid addition salt thereof.

7. A compound of the class consisting of N-3-(10-phenothiazinyl) propyl N'-2-[2-(1,3-dioxolanyl)] ethyl piperazine and a pharmaceutically acceptable acid addition salt thereof.

8. A compound of the class consisting of N-3-(10-phenothiazinyl) propyl N'-2-[2-(1,3-dioxanyl)] ethyl piperazine and a pharmaceutically acceptable acid addition salt thereof.

9. A compound of the class consisting of N-3-(10-phenothiazinyl) propyl N' - 2 - [2 - (4 - methyl - 1,3-dioxolanyl)] ethyl piperazine and a pharmaceutically acceptable acid addition salt thereof.

10. A compound of the class consisting of N-3-(10-phenothiazinyl) propyl N'-2-[2 - (4,5-dimethyl-1,3-dioxolanyl)] ethyl piperazine and a pharmaceutically acceptable acid addition salt thereof.

11. A compound of the class consisting of N-3-(10-phenothiazinyl) propyl N'-2-[2-(4-methyl-1,3-dioxanyl)]

ethyl piperazine and a pharmaceutically acceptable acid addition salt thereof.

12. A compound of the class consisting of N-3-(2-chloro-10-phenothiazinyl) propyl N'-2-[2-(4,5-dimethyl-1,3-dioxolanyl)] ethyl piperazine and a pharmaceutically acceptable acid addition salt thereof.

13. A compound of the class consisting of N-1-(10-phenothiazinyl)-2-propyl N'-2-[2-(4,5-dimethyl-1,3-dioxolanyl)] ethyl piperazine and a pharmaceutically acceptable acid addition salt thereof.

References Cited

UNITED STATES PATENTS

| | | | |
|---|---|---|---|
| 2,908,683 | 10/1959 | Jacob et al. | 260—243 |
| 2,944,054 | 7/1960 | Gordon | 260—243 |
| 2,985,654 | 5/1961 | Sherlock et al. | 260—243 |

NORMA S. MILESTONE, *Primary Examiner.*

H. I. MOATZ, *Assistant Examiner.*